United States Patent Office 2,707,764
Patented May 3, 1955

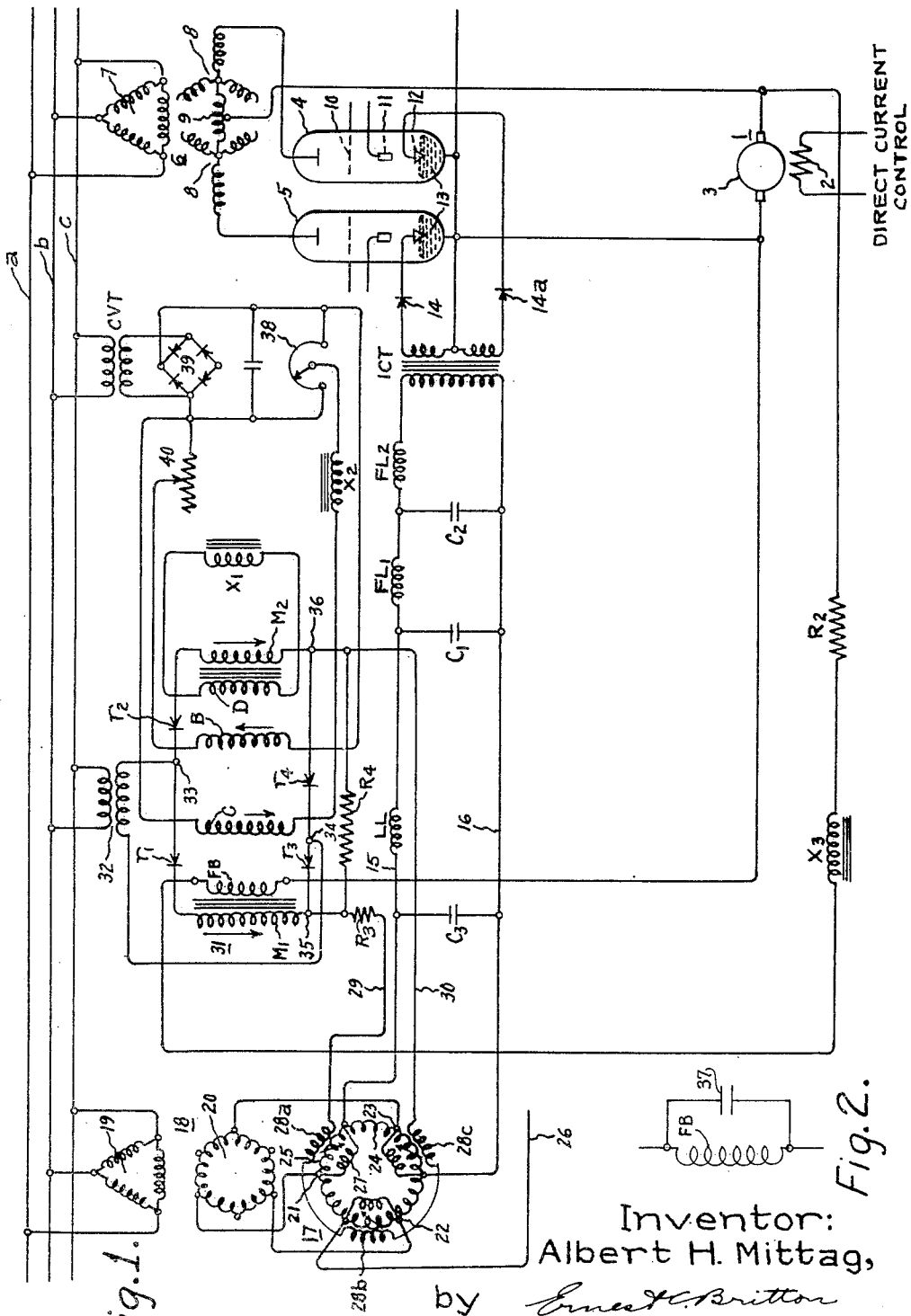

2,707,764

ELECTRONIC MOTOR CONTROL SYSTEM

Albert H. Mittag, Schenectady, N. Y., assignor to General Electric Company, a corporation of New York Application July 22, 1950, Serial No. 175,449

7 Claims. (Cl. 318—331)

This invention relates to electronic motor control systems and more particularly to an improved phase shifting control arrangement for electronic devices wherein magnetic amplifier means are utilized to effect changes in the output voltage of the electronic devices thereby to vary the voltage supply to the armature of a direct current motor in order to control the speed thereof.

While I have shown and described the invention in connection with a control system for a direct current motor, it will be understood that certain features of the invention are generally applicable to magnetic amplifiers or amplistats which are magnetic amplifiers which operate on a self-saturated principle.

In systems where the voltage supplied to the armature of a direct current motor is varied in order to control the speed thereof it is frequently the practice to energize the motor armature from an alternating current circuit through electronic valve means such as ignitrons for example. As is well known, the voltage output of such valves may be varied by varying the time during the alternating current cycle when the valves are rendered conductive. In ignitron tubes which are provided with a mercury pool cathode and an ignitor element immersed therein it is possible to control the output voltage of the valves by simply varying the phase angle at which the ignitor is energized with respect to the anode voltage. To this end the phase of the voltage supplied to the ignitor element through a suitable firing circuit is controlled by known phase shift circuits. In certain phase shift circuits the angle of advance or retard is controlled by a control winding energized with controllable direct current. This controllable direct current may be supplied to the phase shift circuit by means of an amplistat or self-saturating magnetic amplifier. Since it is possible to use a number of control windings on magnetic amplifiers, it is convenient by using such amplifiers to control the control current supplied to phase shifting circuits in a manner which accommodates various conditions in the motor and its energizing circuit so as to achieve smooth speed control over a wide range. For example, the magnetic amplifier may be provided with a reference control winding energized from an adjustable source of direct current energy by means of which winding the speed of the motor is set. It may be desirable to use a feedback winding on the magnetic amplifier which responds to the voltage across the motor armature, and also to use a suitable biasing winding arranged so that the flow of current therethrough establishes a flux in opposition to the flux established by the speed setting winding.

In motor speed control arrangements of the type generally described above the angular relationship between the periods of conduction through the ignitor element and the voltage of the main anode-cathode circuit of the electronic devices used to energize the motor armature is frequently subject to periodic variations commonly referred to as ignitor jitter. Frequently the magnetic amplifier is too slow in responding to the various control signals or is not sufficiently sensitive thereto. Furthermore, a ripple is established in the feedback winding due to the pulsating output of the electronic devices which energize the motor circuit armature. Stated otherwise the counter electromotive force of the motor supplies a pulsating current to the feedback winding of the magnetic amplifier thereby interfering with the proper operation of the control system. Since magnetic amplifiers of the type referred to herein utilize rectifier means in series with the main current windings of the amplistat it frequently occurs that excessive inverse voltages are caused to appear across the rectifiers periodically.

One object of the invention is to provide an improved electronic speed control system for direct current motors which affords smooth speed control from standstill to full speed of the motor.

Other objects and advantages of the invention will become apparent as the following description proceeds and the features of novelty which characterize the invention will be pointed out with particularity in the claims annexed hereto.

In accordance with one aspect of the invention, a damping winding is coupled with the main and control windings of a magnetic amplifier and impedance means is connected across the damping winding for the purpose of damping harmful phase oscillations in the amplifier and associated circuits. In accordance with another feature of the invention, impedance means is arranged in series with a control winding of a magnetic amplifier for the purpose of increasing the gain of the amplifier. In order to prevent undesired pulsations in the amplifier, an impedance is connected in series with a control winding energized from a pulsating source, or if desired, a capacitor may be connected in parallel with such a winding for the same purpose. For reducing inverse voltage peaks across the amplistat rectifiers, a resistor may be used, and in order to reduce the time constant of the amplistat and its load circuit a resistor may be inserted in series therewith.

For a better understanding of the invention reference may be had to the accompanying drawing in which Fig. 1 is a schematic representation of a speed control system for a direct current motor embodying the invention and Fig. 2 illustrates a modification of a part of the embodiment shown in Fig. 1.

In Fig. 1 the motor 1 is provided with a separately excited field winding 2 and an armature 3. The armature 3 is energized through ignitron tubes 4 and 5. Tubes 4 and 5 are energized from transformer 6 having a delta connected primary winding 7 and a pair of Y connected secondary windings 8. The neutral points of the secondary windings 8 are interconnected through a reactor 9 which is tapped at its midpoint to afford a connection for one terminal of the armature 3 of motor 1. For purposes of illustrating the invention only two tubes such as 4 and 5 are shown although it will be understood that transformer 6 as shown could energize two additional pairs of tubes such as 4 and 5. The primary winding 7 of transformer 6 is energized from a suitable source of alternating current energy such as the three-phase supply circuit $a$, $b$, $c$.

Each of the tubes 4 and 5 may be provided with a control grid 10, a holding anode 11, a control member in the form of an ignitor 12, and a mercury pool cathode 13.

The firing circuit for ignitors 12 includes the ignitor coupling transformer ICT and unidirectional conducting devices 14 and 14$a$ which function in known manner to establish a cathode spot within the tubes 4 and 5 during alternate half cycles of the alternating current energy supplied thereto from transformer 6. The primary winding of transformer ICT is energized from the circuit including capacitor $C_1$ and $C_2$ and nonlinear reactors $FL_1$ and $FL_2$ and linear reactor LL. As is more fully explained in application Serial No. 139,681, filed January 20, 1950, Kellogg et al., now Patent 2,523,027 assigned to the assignee of this application, the reactors $FL_1$ and $FL_2$ are arranged so that the saturated impedance of reactor $FL_2$ is less than the saturated impedance of reactor $FL_1$. Thus an accumulation of energy on capacitor $C_1$ after a predetermined accumulation will be discharged through reactor $FL_1$ to energize capacitor $C_2$. When the voltage across capacitor $C_2$ builds up to a sufficient value reactor $FL_2$ will discharge but at a more rapid rate than the discharge of capacitor $C_1$ through reactor $FL_1$. In this way the rate of flow of coulombs is materially increased so that the amperes of current available to the ignitor elements 12 are increased substantially. Suitable capacitance means $C_3$ may be used so that the firing circuit will have a leading power factor and the linear reactor LL is connected in known manner as indicated. While the ignitor firing or control circuit above described constitutes one type of control means for the ignitors, it will be understood that other firing circuits could be used.

The firing circuit for the ignitors 12 is energized from conductors 15 and 16 which in turn are energized from the phase shift circuit generally indicated at 17. Phase shift circuit 17 is energized from a three-phase supply through the transformer 18 having a delta connected primary 19 and a symmetrically arranged secondary winding 20.

As is more fully explained in my application Serial No. 90,529, filed April 29, 1949, now Patent 2,598,433, and assigned to the assignee of this invention, the phase shift circuit 17 is provided with a plurality of input terminals 21, 22 and 23. The input angle between these terminals is of course 120°. Each branch circuit between each pair of input terminals is provided with a fixed reactance 24 and a variable reactance 25. A fixed reactance 27 may be arranged in parallel with each variable reactance 25. As is more fully explained in my Patent 2,598,433, the effect of fixed reactor 27 is to facilitate starting resonance in the firing circuit for the ignitor elements 12. For the purpose of controlling the reactance of the variable reactances 25 of the phase shift circuit 17, the windings 28a, 28b and 28c are all arranged in series and are energized by means of conductors 29 and 30. Conductor 26 is connected to an output terminal of phase shift circuit 17 but is not needed in the schematic two tube arrangement illustrated. Flow of current through conductors 29 and 30 is controlled by the magnetic amplifier generally indicated by the numeral 31.

Amplistat 31 is provided with a pair of main windings $M_1$ and $M_2$, with a feedback winding FB, a control winding C, a biasing winding B, and a damping winding D. Ordinarily the windings $M_1$ and $M_2$ would be respectively wound on their individual magnetic cores which for convenience could be provided with a common supporting means and the feedback, control, biasing, and damping windings would be magnetically coupled with both the main windings. Arranged in a loop circuit with windings $M_1$ and $M_2$ are four rectifiers $r_1$, $r_2$, $r_3$ and $r_4$. Alternating current energy is supplied through the transformer 32 to the input terminals 33 and 34 of the magnetic amplifier 31. The amplistat 31 is provided with output terminals 35 and 36. When the input terminal 33 is positive, current flows through rectifier $r_1$ downwardly through main winding $M_1$ through output terminal 35, conductor 29, the control windings 28a, 28b, and 28c, conductor 30 through rectifier $r_4$ to terminal 34. When terminal 34 is positive, current flows through rectifier $r_3$, through the control windings 28 back through conductor 30, main winding $M_2$, rectifier $r_2$ to terminal 33. Thus a unidirectional current is supplied to the control windings 28 of the phase shift circuit 17. As is well known this control current determines the phase shift accomplished by the circuit 17.

The feedback winding FB is energized from the armature terminals of the motor 1 through resistance $R_2$ and reactance $X_3$. In accordance with one aspect of the invention the reactor $X_3$ effectively eliminates the ripple in the D. C. voltage appearing across armature 3 which can be considered as the counterelectromotive force of the motor 1 or the output voltage of the valves 4 and 5. An alternative method for substantially eliminating this ripple is to connect a capacitor in parallel with winding FB as shown in Fig. 2. Since the use of a capacitor in this manner is an alternative to the use of reactance $X_3$, a capacitor 37 is shown so connected by means of dotted lines. The effect of reactor $X_3$ and of capacitor 37 is to prevent a low frequency hunting of the motor 1.

The speed of motor 1 is manually controllable through the action of control winding C which is energized through a reactance $X_2$ from a controllable source of direct current energy such as the potentiometer 38. Potentiometer 38 is energized from the rectifiers 39 which in turn are energized from constant voltage transformer CVT. In accordance with another feature of the invention, the use of reactor $X_2$ is for the purpose of affording a higher gain for the amplistat 31, or stated otherwise, this reactor is for the purpose of increasing the sensitivity of the amplistat 31.

Since the magnetizing effect of the feedback winding FB and of the control winding C normally would be in opposition to each other, and since the resultant quantity produced by these two windings would not be likely to result in causing the amplistat 31 to operate at the desired point of its characteristic curve, it is desirable to provide a biasing winding B energized from a direct current source through a variable resistance 40. Normally the magnetizing effect of winding B would be in opposition to that of control winding C and in the same direction as the magnetizing effect of feedback winding FB.

Since the arrangement described thus far is likely to result in ignitor jitter particularly if the sensitivity of the magnetic amplifier is high, it is desirable to provide suitable damping means to overcome this objectionable tendency. In accordance with another feature of the invention the damping winding D is magnetically coupled with the other windings of the amplistat and an impedance means $X_1$ is connected across damping winding D. If desired the reactor $X_1$ could be replaced by a suitable resistance. Obviously the terminals of damping winding D could not be short circuited since this would slow down the action of the magnetic amplifier unduly.

During the half cycle when the input terminal 33 is positive and the input terminal 34 is negative, rectifiers $r_1$ and $r_4$ are conducting and the inverse voltage is applied across rectifiers $r_2$ and $r_3$. Of course inverse voltage is applied to rectifiers $r_1$ and $r_4$ when rectifiers $r_2$ and $r_3$ are conducting. In order to limit the value of this inverse voltage and in accordance with still another aspect of the invention, the resistance $R_4$ is connected across the output terminals 35 and 36 of the amplistat 31. I have found that the use of resistance $R_4$ effectively limits the inverse voltage and thereby prevents damage to the rectifiers.

It is important that the output current from the terminals 35 and 36 be quickly responsive to the various signals supplied to the windings of the amplistat and to this end the resistance $R_3$ is inserted in series with the output terminals 35 and 36 and with the control windings 28a, 28b and 28c. The effect of resistor $R_3$ is to reduce substantially the time constant of the direct current saturating circuit for the phase shift circuit 17 and thereby to increase its speed of response.

While I have shown and described a preferred embodiment of the invention it will be understood that the invention may well take other forms and I, therefore, intend in the appended claims to cover all such changes and modifications as fall within the true spirit and scope of the invention.

What I claim as new and desire to secure by Letters Patent of the United States is:

1. In combination, an alternating current supply circuit, a direct current motor, electric valve means having an anode, a cathode, and a control member interposed between said supply circuit and said motor, control means for energizing said control member, phase shifting means for varying the angular relationship between the energization of said control means and the voltage of said anode and said cathode, amplistat means having main windings energized from a source of alternating current energy and arranged to supply control current to said phase shifting means, a control winding for said amplistat, adjustable means for energizing said control winding with predetermined polarity, a biasing winding for said amplistat, adjustable means for energizing said biasing winding, a feedback winding on said amplistat energized in accordance with the armature voltage of said motor, and reactance means in series with said feedback winding for substantially eliminating undesired pulsations in current therethrough.

2. In combination, an alternating current supply circuit, a direct current motor, electric valve means having an anode, a cathode, and a control member interposed between said supply circuit and said motor, control means for energizing said control member, phase shifting means for varying the energization of said control means relative to the voltage between said anode and said cathode, amplistat means having main windings energized from a source of alternating current energy and arranged to supply direct current to said phase shifting means, a control winding for said amplistat, adjustable means for energizing said control winding with predetermined polarity, a biasing winding for said amplistat, adjustable means for energizing said biasing winding, a feedback winding on said amplistat energized in accordance with the armature voltage of said motor, and capacitance means in parallel with said feedback winding for substantially eliminating undesired pulsations in current therethrough.

3. In combination, an alternating current supply circuit, a direct current motor, electric valve means having an anode, a cathode, and a control member interposed between said supply circuit and said motor, control means for energizing said control member, phase shifting means for varying the angular relationship between the energization of said control means and the voltage of said anode and said cathode, amplistat means having main windings energized from a source of alternating current energy and arranged to supply direct current to said phase shifting means, a control winding for said amplistat, adjustable means for energizing said control winding with predetermined polarity, impedance means in series with said control winding and said adjustable means for increasing the sensitivity of said amplistat, a biasing winding for said amplistat, adjustable means for energizing said biasing winding, a feedback winding on said amplistat energized in accordance with the armature voltage of said motor, and reactance means in series with said feedback winding for substantially eliminating undesired pulsations in current therethrough.

4. In combination, an alternating current supply circuit, amplistat means having a pair of input terminals energized from said alternating current circuit, a pair of main circuits connected in parallel across said input terminals, each of said main circuits including a main winding and a pair of unidirectional conducting devices arranged to conduct current in oppostie directions, one of said devices being interconnected between one of said input terminals and its associated main winding and the other of said devices being interconnected between the other of said input terminals and its associated main winding, the junctions between each of said main windings and each of said other devices forming a pair of output terminals for said amplistat, a control circuit energized from said output terminals, said devices being arranged so that alternate half cycles of energy from said input terminals are conducted by said main circuits, means for controlling the impedance of said main windings, and resistance means in series with said output terminals for increasing the speed of response of said control circuit.

5. In combination, an alternating current supply circuit, amplistat means having a pair of input terminals energized from said alternating current circuit, a pair of main circuits connected in parallel across said input terminals, each of said main circuits including a main winding and a pair of unidirectional conducting devices arranged to conduct current in opposite directions, one of said devices being interconnected between one of said input terminals and its associated main winding and the other of said devices being interconnected between the other of said input terminals and its associated main winding, the junctions between each of said main windings and each of said other devices forming a pair of output terminals for said amplistat, a control circuit energized from said output terminals said devices being arranged so that alternate half cycles of energy from said input terminals are conducted by said main circuits, resistance means connected across said output terminals for reducing the inverse voltage applied to said unidirectional conducting devices, means for controlling the impedance of said main windings, and resistance means in series with said output terminals for increasing the speed of response of said control circuit.

6. In an electric motor control circuit, phase shifting means, amplistat means having main windings energizable from a source of alternating current energy and arranged to supply direct current to said phase shifting means, a control winding for said amplistat, adjustable means for energizing said control winding with predetermined polarity, impedance means in series with said control winding and said adjustable means for increasing the sensitivity of said amplistat, a biasing winding for said amplistat, adjustable means for energizing said biasing winding, a feedback winding on said amplistat energized in accordance with the armature voltage of the motor to be controlled, and reactance means in parallel with said feedback winding for substantially eliminating undesired pulsations in current therethrough.

7. In an electric motor control circuit, phase shifting means, amplistat means having main windings energized from a source of alternating current energy and arranged to supply direct current to said phase shifting means, a control winding for said amplistat, adjustable means for energizing said control winding with predetermined polarity, a biasing winding for said amplistat, adjustable means for energizing said biasing winding, a feedback winding on said amplistat energized in accordance with the armature voltage of the motor to be controlled, and capacitance means in parallel with said feedback winding for substantially eliminating undesired pulsations in current therethrough.

References Cited in the file of this patent

UNITED STATES PATENTS

| Number | Name | Date |
|---|---|---|
| 1,878,764 | Dowling | Sept. 20, 1932 |
| 1,926,275 | Fitzgerald | Sept. 12, 1933 |
| 2,144,290 | Hanley | Jan. 17, 1939 |
| 2,182,666 | Hanley | Dec. 5, 1939 |
| 2,313,526 | Edwards | Mar. 9, 1943 |
| 2,341,526 | Breitinstein | Feb. 15, 1944 |
| 2,414,936 | Edwards et al. | Jan. 28, 1947 |
| 2,504,105 | Bendz | Apr. 18, 1950 |
| 2,516,568 | Haneiko | July 25, 1950 |

FOREIGN PATENTS

| Number | Country | Date |
|---|---|---|
| 589,341 | Great Britain | June 18, 1947 |